United States Patent Office 3,332,813
Patented July 25, 1967

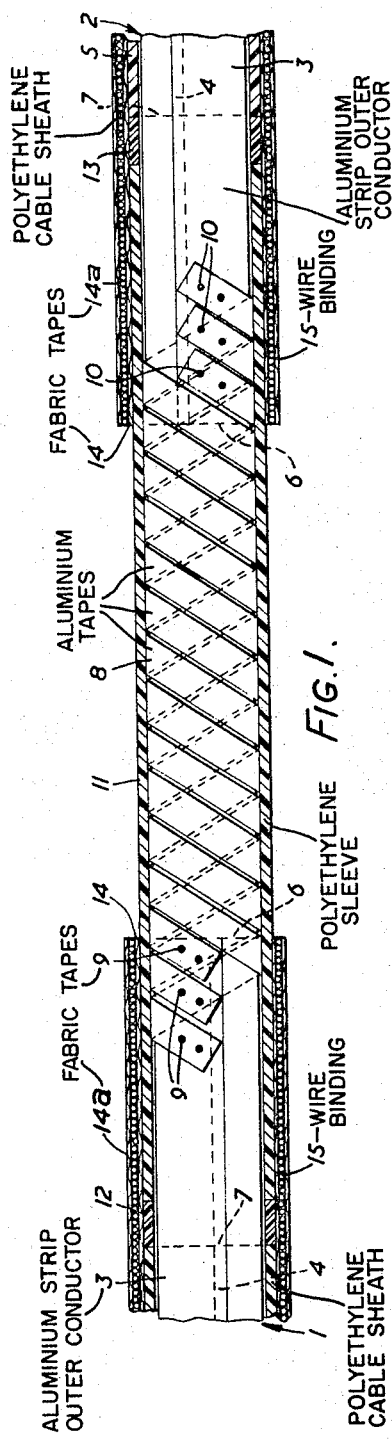
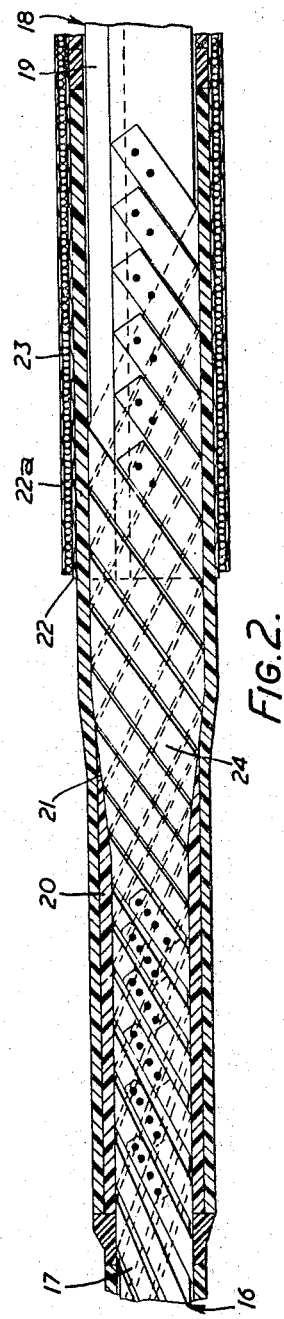

3,332,813
METHOD FOR SPLICING COAXIAL SUBMARINE CABLES
Eric Fifield Stuart Clarke, Kenton, Harrow, England, assignor to Her Majesty's Postmaster General, London, England
Filed Oct. 7, 1963, Ser. No. 314,294
Claims priority, application Great Britain, Oct. 11, 1962, 38,629/62
6 Claims. (Cl. 156—49)

This invention relates to submarine cables and has reference to submarine cables of the co-axial type. In particular, the invention relates to co-axial submarine cables in which the tensile strength required of the cable to resist stresses imposed during laying and recovery is supplied solely by a high tensile strength steel core disposed within the inner conductor of the co-axial cable. Co-axial submarine cables having the construction just described are referred to herein as "co-axial submarine cables of the type referred to."

Certain forms of a co-axial submarine cable of the type referred to have an outer (return) conductor consisting of a single strip of aluminum formed into a cylinder around the polyethylene insulant and left with its edges overlapping. The cylinder is kept in position by a tightly extruded sheath of polyethylene. That construction is normally satisfactory for a uniform length of cable but some difficulty has been encountered particularly in making efficient joints which will withstand the flexing which occurs, for example, when the cable passes through multi-sheave laying gear. Uniform lengths of cable have also sometimes been found to possess faults.

According to the present invention a co-axial submarine cable of the type referred to and having an outer conductor composed of a strip of longitudinally applied electrically-conductive material includes a selected length or lengths having an external strengthening member applied in such manner as to increase to a desired value the hoop stress acting on the outer conductor of the cable over the length or lengths.

The strengthening member may consist of lacing twine or wire bound tightly round the cable over each length. The wire may be of copper or of galvanised iron or it may be steel piano wire. Before, application of the twine or wire, the surface of the cable may be prepared to receive the strengthening member by, for example, the application of a serving of some suitable material.

By way of example only, co-axial submarine cables of the type referred to embodying the invention will now be described in greater detail with reference to the accompanying drawings of which:

FIG. 1 is a cross section of a joint between submarine cables having the same external diameter, and, FIG. 2 is a cross section of a joint between submarine cables having different external diameters.

FIG. 1 is a cross section of a joint between the ends of co-axial submarine cables 1, 2 of external diameter 1.5 inches and each having a high tensile strength steel wire core (not shown) surrounded by polyethylene insulant and an outer conductor 3 consisting of a strip of aluminium laid longitudinally round the insulant with its edges overlapping as at 4. An outer sheath 5 of polyethylene covers the cable.

The joint between the cable ends is formed by first cutting back the outer conductors 3 of the cables to positions indicated by the dotted lines 6 and also the outer sheaths 5 to the lines 7. The cable ends are then joined by first securing together the ends of the high tensile strength cores after which the inner conductors are joined and a sheath of polyethylene insulant formed round the inner conductors.

To join the outer conductors 3, tapes 8 of aluminium are cold pressure-welded as at 9 to the outer conductor of cable 1 and then laid helically round the exposed insulant covering the inner conductor and cold pressure-welded at 10 to the outer conductor of the other cable 2.

A polethylene sleeve 11 is then formed round the helically wound tapes, the sleeve being moulded to the sheaths 5 of the cables 1, 2 at positions 12 and 13.

Outer servings of petroleum bitumen-impregnated fabric tape 14 are now applied over the junctions between the new sleeve 11 and the sheaths of the cable as shown. Each serving extends from a position at the end of the original outer conductor of the cable to a point about an equal distance beyond the joint 12 or 13. The tapes 14 form beddings for galvanised iron wire 15 wound tightly around the cable and secured in position. An outer covering of the fabric tape 14a is then placed over the wire binding 15.

The function of the wire binding is to ensure close contact between the outer polyethylene sleeve or sheath and the outer conductor so as to prevent "cockling" and possible cracking of the latter which may occur when the cable is flexed. That function is achieved by the increase in hoop stress acting on the outer conductor due to the wire binding.

The choice of material for the strengthening member is determined by the need to have an adequate number of pressure points on the outer sheath, to have sufficient flexibility and to have sufficient strength. The tension in the strengthening member is considerable, approching the ultimate tensile strength of the material.

In the example just described, 16 S.W.G. galvanised iron wire is used which is laid tightly with a serving mallet or similar tool.

FIG. 2 shows a joint between the cables of different external diameters. Cable 16 has an external diameter of 0.99 inch with a helically wound outer conductor 17 whilst cable 18 has an external diameter of 1.5 inches and a longitudinal strip outer conductor 19. The joint is of a construction similar to that described above and made in like manner except that a split polyethylene sleeve 20 is applied, over the helical tapes of the smaller diameter cable 16 as shown to increase the diameter of that part of the joint to that of the cable 18. The ends of the sleeve 20 are tapered as at 21.

In the embodiment of FIG. 2, fabric tape 22 and galvanised iron wire 23 are applied over the junction between the helically wound aluminium tapes 24 and the strip outer conductor 19 of cable 18. A further layer of tape 22a is applied over wire binding 23. Reinforcement is not necessary in the vicinity of the joints between the tapes 24 and the outer conductor 17 of cable 16 since experience has shown that the helically wound tapes can withstand the flexing that is liable to occur.

In the example just described with reference to FIG. 2, helically wound tapes 24 are used to join the outer conductor 17 of cable 16 to the outer conductor 19 of cable 18. The use of the addition tapes 24 can be avoided by making available a sufficient length of the outer conductor tapes of cable 16 to bridge the joint between the cores and to permit direct connection to the outer conductor 19 of cable 18. That can be achieved by, during the preparation of the end of cable 16, turning back the tapes of the outer conductor 17 and then laying them over the insulation formed round the joined inner conductors. This alternative technique avoids the need to weld to the tapes of the outer conductor 17 as described above.

The fabric tape can be omitted but its use is desirable when the outer covering, i.e. the sleeve, and the outer sheaths of the cables are of a particularly hard form of polyethylene or a particularly soft form.

The techniques described above are not limited to use on cable joints. Any particular length of co-axial submarine cable can be strengthened in respect of the hoop stress required. Strengthening is applied where is it suspected that cocking may occur, for example where there is discontinuity in either sheath or return conductor arising perhaps from irregularity or damage or after manufacture.

I claim:

1. A method of jointing two lengths of co-axial submarine cable each comprising an inner core of high tensile strength material that provides the tensile strength which the cable is required to possess, an inner conductor surrounding said core, a layer of electrically insulating material enclosing said inner conductor, an outer conductor disposed around said layer and an outer sheath of electrically insulating material, the method comprising the steps of exposing the inner cores and the inner and outer conductors over part only of the lengths, securing together the ends of the inner cores, joining the inner conductors, forming a coating of electrically insulating material around the exposed inner conductors and the junction between the latter, joining said outer conductors by connecting each of a series of helically applied strips of electrically conducting material between the ends of said exposed outer conductors, said strips being applied over said coating, re-forming the outer sheath of electrically insulating material over said strips and binding round the joined lengths over the connections between the said strips and outer conductors, a strengthening member which increases the hoop stress applied to said outer conductors and said strips at the connections therebetween and in the vicinity of said connections.

2. A method as claimed in claim 1 and further including the step of applying serving to the outer sheath in the vicinity of said connections before binding said strengthening members in position.

3. A method as claimed in claim 1 in which the strengthening member is selected from the group consisting of twine, copper wire, galvanized wire and steel wire.

4. A method of jointing a first length of coaxial submarine cable and a second length of co-axial submarine cable, each length comprising an inner core of high tensile strength material which provides the tensile strengths which the lengths are required to possess, an inner conductor surrounding said core, an inner layer of insulatant enclosing said conductor, an outer conductor round said insulant, and an outer sheath of insulant applied over said outer conductor, said second length having an overall diameter which is different from that of said first length of which the outer conductor consists of a number of helically wound strips of electrically conductive material, the method comprising the steps of:

(i) exposing the inner cores, inner and outer conductors of said lengths by cutting back as necessary said outer sheaths, outer conductors, inner layers and said inner conductors, (ii) joining together the ends of said cores and the inner conductors, (iii) forming a layer of insulant round the exposed inner conductors and the junction therebetween, (iv) joining said outer conductors, (v) forming a sleeve of insulant over said outer conductors, (vi) forming a sheath of insulant over said sleeve and and any exposed outer conductor, and, (vii) binding over said sheath round and in the vicinity of said junction between said outer conductors, a reinforcing member to increase the hoop stress applied to said outer conductor at said junction and in the vicinity thereof.

5. A a method as claimed in claim 4 and further comprising the step of applying serving to said sheath before binding on said strengthening member over said serving.

6. A method of jointing a first length of co-axial submarine cable and a second length of co-axial submarine cable, each length comprising an inner core of high tensile strength material which provides the tensile strengths which the lengths are required to possess, an inner conductor surrounding said core, an inner layer of insulant enclosing said conductor, an outer conductor round said insulant, and an outer sheath of insulant applied over said outer conductor, said second length having an overall diameter which is different from that of said first length of which the outer conductor consists of a number of helically wound strips of electrically conductive material, the method comprising the steps of:

(i) exposing the inner cores, inner and outer conductors of said lengths by cutting back as necessary said outer sheaths, outer conductors, inner layers and said inner conductors, (ii) joining together the ends of said cores and the inner conductors, (iii) forming a layer of insulant round the exposed inner conductors and the junction therebetween, (iv) joining said outer conductors by helically winding a series of electrically conductive strips over said formed layer of insulant, (v) cold pressure welding said strips at one end to the helical strips comprising the outer conductor of said first length and at the other end to the outer conductor of said second length, (vi) forming a sleeve of insulant over said helically wound strips, (vii) forming a sheath of insulant over said sleeve and any exposed outer conductor, and (viii) binding over said sheath round and in the vicinity of said welds between said helically wound strips and said outer conductor of said second length, a reinforcing member to increase the hoop stress applied to said outer conductor at said weld and in the vicinity thereof.

References Cited

UNITED STATES PATENTS

| | | | |
|---|---|---|---|
| 2,133,448 | 10/1938 | Harley | 174—88 |
| 2,536,173 | 1/1951 | Hamilton | 156—49 |
| 2,740,826 | 4/1956 | Bondon | 174—28 |
| 2,768,105 | 10/1956 | Dittmore et al. | 156—49 |
| 2,958,722 | 11/1960 | Rubin et al. | 174—84 |
| 3,121,136 | 2/1964 | Mildner | 174—28 |

EARL M. BERGERT, *Primary Examiner.*

DARRELL L. CLAY, *Examiner.*

T. R. SAVOIE, D. A. KETTLESTRING,
*Assistant Examiners.*